United States Patent [19]

Havens

[11] Patent Number: 4,753,767
[45] Date of Patent: Jun. 28, 1988

[54] EXTRUSION APPARATUS AND METHOD

[75] Inventor: Carl B. Havens, Newark, Ohio

[73] Assignee: The Dow Chemical Company, Midland, Mich.

[21] Appl. No.: 847,786

[22] Filed: Apr. 3, 1986

[51] Int. Cl.$^4$ .................. B29C 47/88; B29C 47/92
[52] U.S. Cl. ................... 264/565; 264/567; 425/141; 425/72.1; 425/326.1; 425/387.1
[58] Field of Search ............. 264/565, 566, 567, 40.5, 264/564, 556, 48; 425/72 R, 327, 326.1, 141, 387.1

[56] References Cited

U.S. PATENT DOCUMENTS

| | | | |
|---|---|---|---|
| 2,769,200 | 11/1956 | Longstreth et al. | 425/466 |
| 2,963,741 | 12/1960 | Longstreth et al. | 425/466 |
| 3,088,167 | 5/1963 | Corbett | 425/72 R |
| 3,122,790 | 3/1964 | Albert | 425/466 |
| 3,391,051 | 7/1968 | Ehrenfreund et al. | 264/48 |
| 3,482,280 | 12/1969 | Ronden | 425/327 |
| 3,574,806 | 4/1971 | Potter et al. | 425/72 R |
| 3,976,733 | 8/1976 | Havens | 425/72 R |
| 4,017,575 | 4/1977 | Heyer | 425/224 |
| 4,025,253 | 5/1977 | Havens | 425/72 R |
| 4,265,853 | 5/1981 | Havens | 264/565 |
| 4,267,146 | 5/1981 | Kurtz et al. | 264/564 |
| 4,282,177 | 8/1981 | Kurtz et al. | 264/564 |
| 4,348,349 | 9/1982 | Kurtz | 264/564 |
| 4,360,494 | 10/1982 | Kurtz | 264/564 |
| 4,415,711 | 11/1983 | Jones | 264/569 |
| 4,464,318 | 8/1984 | Upmeier et al. | 264/40.1 |

FOREIGN PATENT DOCUMENTS 153610 5/1952 Australia .................. 264/565

*Primary Examiner*—Jeffery Thurlow

[57] ABSTRACT

Extrusion apparatus for producing a continuous molten tube of a film-forming material includes an extrusion die defining an annular extrusion orifice between adjustable die lips through which a heat-plastified, synthetic, resinous, extrudable film-forming material is extruded in a radial direction. An annular gas bearing in spaced relationship to the orifice redirects the film into a tubular shape. In one die arrangement extrusion takes place radially outward, whereas in a second die arrangement extrusion takes place radially inward.

6 Claims, 2 Drawing Sheets

4,753,767

EXTRUSION APPARATUS AND METHOD

BACKGROUND OF THE INVENTION

The present invention relates to a method and apparatus for producing a continuous molten tube of a film-forming material and, more paraticularly to such a method and apparatus in which the tube is formed by extrusion in an improved fashion, permitting fine adjustment of film thickness.

A number of different techniques are used to form extrudable, synthetic resinous thermoplastic compositions into film material. The two major methods for the preparation of plastic film by extrusion are tube extrusion and slot die extrusion. In the tube extrusion process, the heat plastified material, extruded in the form of a tube, is stretched over a suitable support, such as a mandrel or, alternatively, a trapped gas bubble. The gas -bubble is formed between the extrusion die and nip or pinch rolls spaced from the die.

Two variations of the slot extrusion process are commonly employed. In the first variation, chill roll casting, the extrudate from a slot or sheeting die, is deposited on a cooled roll which is rotated at a surface speed in excess of the extrusion rate. The thickness of the resultant film is thus controlled by the thickness of the extrude, the relative speed of extrusion, and the surface speed of the chill roll. A second variation of slot extrusion is tentering, in which a sheet is extruded, grasped at the edges by mechanical supports, and stretched both in the direction of extrusion and in the transverse direction.

Although maximum control of the extrudate, including stretching rate, is obtained with the tentering process, this process is mechanically complex and requires that a relatively large portion of extrude along the edges be discarded as scrap. Chill roll casting, on the other hand, is mechanically simple but imposes severe restrictions on the molecular orientation which may be introduced into the film, especially in the direction transverse to the direction of extrusion. Tube extrusion offers substantial advantages in the rate of production possible and in the reduction of scrap production. In typical prior art tube extrusion from a generally circular slot defined by die lips in the extrusion die. The die lips extend generally parallel to the longitudinal axis of the tube. The construction of such a conventional tubular die is such that adjusting the thickness of this circular slot to equalize the flow rate around the die requires an adjustment in an outer concentric ring of the die with respect to an inner ring. It will be appreciated, therefore, that the fine adjustment which is available on a flexible lip slot extrusion die is not possible with such a conventional tubular die, since independent adjustment around the die is not possible.

Accordingly, it is seen that there is a need for an improved extrusion process and apparatus for producing a continuous molten tube of a film-forming material in which flow rates around the die may be equalized and in which other extrusion properties are facilitated.

SUMMARY OF THE INVENTION

This need is met by an extrusion method and apparatus according to the present invention for extruding a continuous molten tube of a film-forming material. The apparatus comprises, in cooperative combination, a source of heat-plastified, synthetic, resinous, extrudable film-forming material, an extrusion die defining an annular extrusion orifice between adjustable die lips, and an annular gas bearing. The adjustable die lips extend radially with respect to the molten tube and the extrusion orifice is in cooperative communication with the source of film-forming material to extrude a film radially therethrough. An annular gas bearing is positioned in spaced relationship to the orifice, coaxially disposed with respect thereto, for redirecting the film received from the orifice into the tubular shape.

The die lips may extend radially inward with respect to the molten tube and the annular gas bearing may be positioned generally radially inward with respect to the annular extrusion orifice such that the film extruded from the orifice passes within the annular gas bearing. The gas bearing defines a generally curved inner surface around which the extruded film passes, such that the film may be subsequently expanded into a tube shape having a diameter substantially greater than the inner diameter of the annular gas bearing.

The die may alternatively define lips which extend radially outward with respect to the molten tube, and the annular gas bearing may be positioned generally radially outward with respect to the annular extrusion orifice. The film extruded from the orifice passes around the outside of the annular gas bearing. The annular gas bearing may define a generally curved outer surface around which the extruded film passes such that the film may subsequently be expanded into a tube shape having a diameter substantially greater than the diameter of the extrusion orifice.

The method according to the present invention for extruding a continuous molten tube of a film-forming material comprises the steps of:

(a) extruding a film of a heat-plastified, synthetic, resinous, film-forming material from an annular extrusion orifice having radially extending die lips to give a radial direction of flow for the film-forming material;

(b) directing the film to an annular gas bearing; and (c) redirecting the film from the annular gas bearing into a tubular shape for further film formation without substantial drag of the film forming material across the walls of the orifice, whereby the wall thickness of the continuous molten tube may be adjusted by adjusting the spacing between the die lips.

The step of extruding a film of a heat-plastified, synthetic, resinous, film-forming material may include the step of extruding the material radially inward with respect to the molten tube. The step of directing the film to an annular gas bearing may include the step of directing the film radially inward with respect to the annular extrusion orifice. The step of redirecting the film from the annular bearing may include the step of redirecting the film generally axially with respect to the tube to form the tubular shape.

The method may further include the step of increasing the diamaeter of the tube subsequent to redirection by the annular gas bearing. The step of increasing the diameter of the tube may include the step of increasing the tube diameter by means of a trapped air bubble within the tube to at least equal the diameter of the extrusion orifice.

The step of extruding a film of a heat-plastified, synthetic, resinous, film-forming material may include the step of extruding the material radially outward with respect to the molten tube. The step of directing the film to an annular gas bearing may include the step of directing the film radially outward with respect to the annular extrusion orifice. The step of redirecting the film from the annular gas bearing may include the step of redirecting the film generally axially with respect to the tube to form the tubular shape.

The method may further comprise the step of increasing the diameter of the tube subsequent to redirection by the annular gas bearing. The step of increasing the diameter of the tube may include the step of increasing the tube diameter by means of a trapped air bubble within the tube to at least equal the diameter of the extrusion orifice.

Accordingly, it is an object of the present invention to provide an extrusion method and apparatus for producing a continuous molten tube of a film-forming material in which a heat-plastified, synthetic, resinous, extrudable film-forming material is initially extruded in a radial direction between adjustable die lips and subsequently redirected into a tubular shape by an annular gas bearing; to provide such a method and apparatus in which extrusion occurs radially inward with respect to the molten tube such that the extruded material is redirected by passing within the annular gas bearing; to provide such a method and apparatus in which the annular gas bearing defines a generally curved inner surface around which the extruded film passes; to provide such a method and apparatus in which the diameter of the tube is subsequently expanded after passing withing the annular gas bearing; to provide such a method and apparatus in which the material is initially extruded radially outward with respect to the molten tube and passes around the outside of the annular gas bearing; to provide such a method and apparatus in which the annular gas bearing defines a generally curved outer surface around which the extruded film passes such that the film may subsequently be expanded into a tube shape; and to provide such a material extruded may be easily adjusted around the tube.

Other objects and advantages of the invention will be apparent from the following description, the accompanying drawings and the appended claims.

DETAILED DESCRIPTION OF THE PREFERRED EMBODIMENTS

Figure 1:
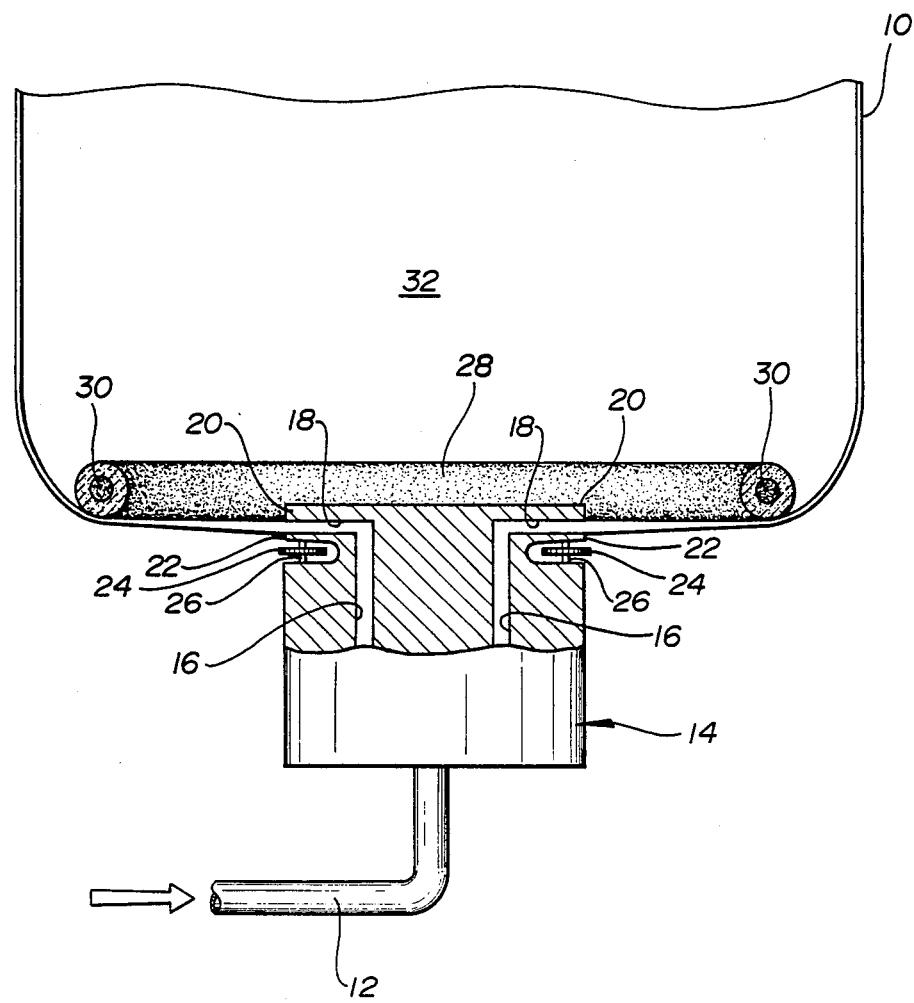
FIG. 1 is a side view of a first embodiment of the extrusion apparatus according to the present invention, with portions broken away and in section.

Reference is made to FIG. 1 of the drawings which illustrates a first embodiment of the extrusion apparatus of the present invention. The apparatus produces a continuous molten tube 10 of a film-forming material, such as for example a polyethylene material. As will be apparent, however, the present invention may be utilized to produce a molten tube from many various types of film-forming materials. The apparatus comprises a transfer conduit 12 which acts as a source of a heat-plastified, synthetic, resinous, extrudable film-forming material. Preferably, the conduit 12 receives the film-forming material from a conventional extruder. An annular die 14, operatively connected to the conduit 12, defines a generally cylindricaal flow channel 16 therein for transporting film-forming material to an annular extrusion orifice 18 defined between adjustable die lips 20 and 22. Lips 20 and 22 extend radially with respect to the molten tube 10. The extrusion orifice 18 is thus in operative communication with the conduit 12 such that film-forming material may be extruded therethrough.

The thickness of the orifice 18 may be adjusted circumferentially around the die 14 by means of a series of thumb wheels 24, secured to threaded shafts 26, which are spaced around the die 14. Shafts 26, when rotated, cause lip 22 to flex slightly vertically, thereby adjusting the orifice dimension and providing a means of independently balancing the flow rate of the material around the circumference of the die 14.

An annular gas bearing 28 is provided in spaced relationship to the orifice 18 and is generally coaxially disposed thereto for redirecting the film received from the orifice 18 into the tube 10. Gas bearing 28, of conventional construction, may comprise a ring of porous material having a cavity 30 to which a gas, such as air, is supplied at a slightly elevated pressure. The gas emerging from the bearing 28 provides a gas layer over which the film slides without appreciable drag. Although the film passes closely around the bearing, it does not actually contact the bearing surface, thereby insuring the smooth, unrestriction passage of the film. The tube 10 may then be expanded to a desired tube diameter by means of controlling the amount of air trapped in a bubble within the tube 10, indicated at 32. Air rings for cooling the film may be provided at a point adjacent the die 14, adjacent the gas bearing 28, or at any subsequent point along the tube 10. In this embodiment, the lips 20 and 22 extend radially outward with respect to the molten tube 10. As a result of this construction, the vertical dimension of the orifice 18 may be adjusted at any point around the die 14 without affecting this dimension at other points. It will be appreciated, therefore, that this results in a die construction which is substantially improved as compared to prior tubular extrusion art dies. Although the initial extrusion direction of the film is radially outward, the gas bearing 28 allows the film to be diverted into its tubular shape without significant drag across the lips 20 and 22 of the die 14.

Figure 2:
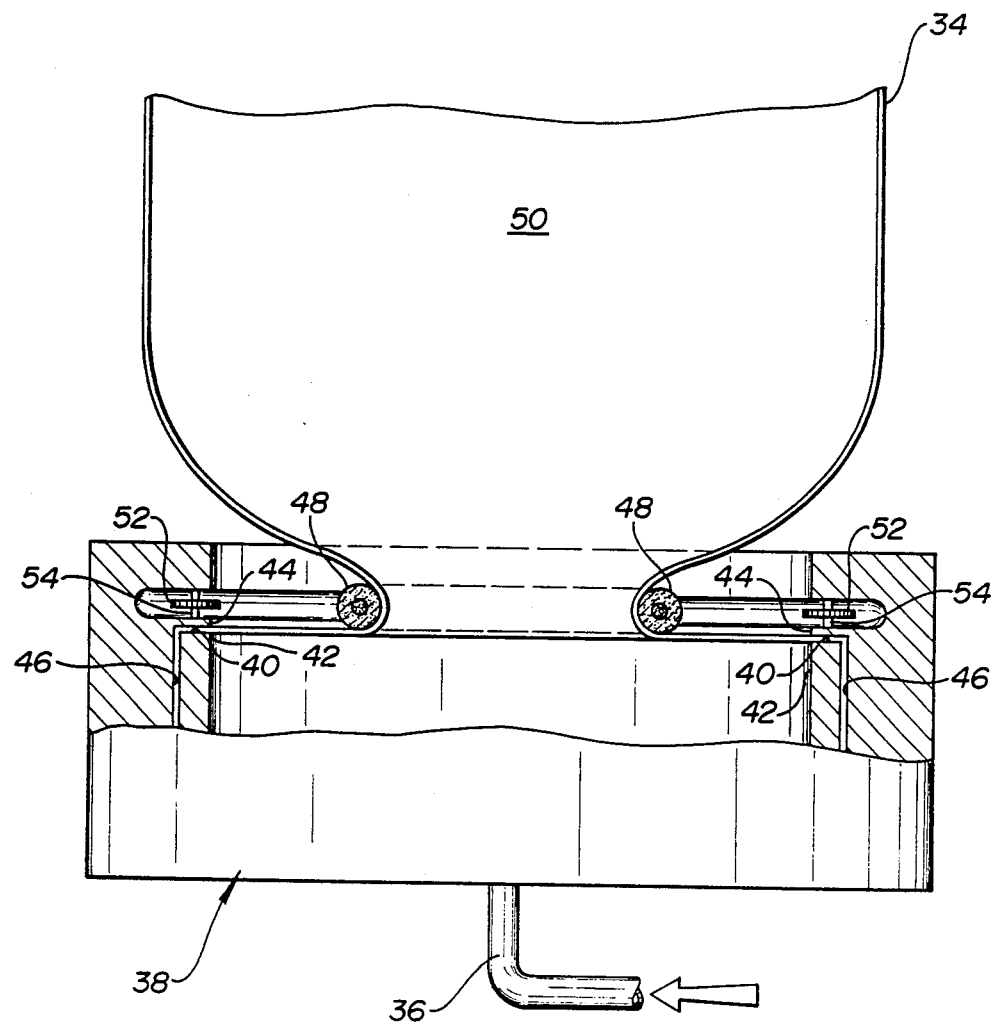
FIG. 2 is a side view of a second embodiment of the extrusion apparatus according to the present invention, with portions broken away and in section.

Reference is now made to FIG. 2 of the drawings which illustrates a second embodiment of the extrusion apparatus of the present invention for producing a continuous molten tube 34 of a film-forming material. As with the previously described embodiment, the apparatus shown in FIG. 2 includes a conduit 36 which is connected to an extruder and which receives a heat-plastified, synthetic, resinous, extrudable film-forming material. An extrusion die 38 defines an annular extrusion orifice 40 between adjustable die lips 42 and 44. Unlike the previous embodiment, however, lilps 42 and 44 extend radially inward with respect to the molten tube 34. The extrusion orifice 40 is in operative communication with the conduit 36 through a generally cylindrical passage 46. An annular gas beaing 48 is positioned in spaced relationship to the orifice 40, generally coaxially disposed thereto, for redirecting the film received from the orifice into the tube 34. The annular gas bearing 48 is positioned generally radially inward with respect to the annular extrusion orifice 40 such that the film extruded from the orifice passes within the annular gas bearing 48. The gas bearing defines a generally curved inner surface around which the extruded film passes such that the film may be subsequently expanded into a tube shape having a diameter substantially greater than the inner diameter of the annular gas bearing. The film does not actually contact the surface of the bearing 48, however, due to the flow of gas from the bearing 48.

As with the previous embodiment, expansion of the tube 34 may be accomplished by means of a trapped air bubble within the tube 34, indicated at 50. Alternatively, expansion may be accomplished by other conventional means.

As with the previously described embodiment provision is made by thumb wheels 52 and associated threaded shafts 54, spaced around the die 38 in contact with the upper lip 44, for adjusting the orifice dimension. If desired, cooling by means of an air ring may be provided adjacent the extrusion orifice 40, adjacent the gas bearing 48, or at any point downstream from the gas bearing 48.

It will be appreciated that the embodiment of FIG. 2 utilizes a larger die for a given diameter of tube. This has the advantage that increased production rates are possible without increasing the pressure excessively. Another disadvantage is that the tube 34 may be drawn or expanded in diameter subsequent to passage through the gas bearing 48 while utilizing a die having an extrusion orifice which is generally the same diameter as the expanaded tube 34. This allows the molecular reorientation of the tube 34 to occur by drawing or expanding the tube diameter while using a die having a large diameter orifice.

It will be appreciated that in both of the embodiments disclosed herein the spacing between the adjustable die lips may be readily adjusted at various points around the die while leaving unaltered the orifice dimension at other points. The embodiment of FIG. 2, additionally provides for drawing the tube subsequent to extrusion but drawing it to a diameter substantially equal to the original orifice diameter. The film-forming material may therefore be extruded at lower pressures than would otherwise be required with a die of the type shown in FIG. 1 for production of the like diameter tubes.

Having described the invention in detail and by reference to preferred embodiment thereof, it will be apparent that modifications and variations are possible without departing from the scope of the invention defined in the appended claims.

What is claimed is:

1. Extrusion apparatus for producing a continuous molten tube of a film-forming material, comprising in cooperative combination:

a source of heat-plastified, synthetic, resinous, extrudable film-forming material, an extrusion die defining an annular extrusion orifice between adjustable die lips, said lips extending radially inward with respect to said molten tube and said extrusion orifice being in operative communication with said source to extrude a film radially therethrough, means for adjusting the spacing between said adjustable die lips, an annular gas bearing in spaced relationship to said orifice, coaxially disposed thereto, for redirecting said film received from said orifice into said tube, said annular gas bearing being positioned generally radially inward with respect to said annular extrusion orifice such that the film extruded from said orifice passes within said annular gas bearing, and means for expanding said film into said molten tube after said film passes within said bearing, said tube having a diameter at least as great as the diameter of said annular die.

2. The extrusion apparatus of claim 1 in which said gas bearing defines a generally curved inner surface around which said extruded film passes such that said film may subsequently be expanded into a tube shape having a diameter substantially greater than the inner diameter of said annular gas bearing.

3. A method for extruding a continuous molten tube of a film-forming material, comprising the steps of:

extruding a film of a heat-plastified, synthetic, resinous, film-forming material from an annular extrusion orifice, having adjustable die lips which extend radially inward to give a radial direction of flow for said film-forming material, adjusting the spacing between said die lips, directing said film radially inward to an annular gas bearing, and redirecting said film radially outward from said annular gas bearing into a tubular shape having a diameter at least as great as that of said die lips for further film formation without substantial drag of the film forming material across the walls of said orifice, whereby the wall thickness of said continuous molten tube may be adjusted by adjusting the spacing between said die lips.

4. The method of claim 3 for extruding a continuous molten tube of a film-forming material in which the step of redirecting said film from said annular gas bearing includes the step of redirecting said film generally axially with respect to said tube to form said tubular shape.

5. The method of claim 4 for extruding a continuous molten tube of film-forming material further comprising the step of increasing the diameter of said tube subsequent to redirection by said annular gas bearing.

6. The method of claim 5 for extruding a continuous molten tube of a film-forming material in which said step of increasing the diameter of said tube includes the step of increasing the tube diameter, by means of a trapped air bubble within the tube, to a diameter greater than the diameter of said extrusion orifice.

* * * * *

UNITED STATES PATENT AND TRADEMARK OFFICE
CERTIFICATE OF CORRECTION

PATENT NO. : 4,753,767

DATED : June 28, 1988

INVENTOR(S) : Carl B. Havens

It is certified that error appears in the above-identified patent and that said Letters Patent is hereby corrected as shown below:

Col. 1, line 7, "paraticularly" should read --particularly--.

Col. 1, line 43, following the word "extrusion" insert therefore --processes, however, the tube of molten material is extruded--.

Col. 2, line 56, "diamaeter" should read --diameter--.

Col. 3, line 35, following the words "such a" insert therefore --method and apparatus in which the flow rate of the--.

Col. 3, line 64, "cylindricaal" should read --cylindrical--.

Col. 4, line 22, "unrestriction" should read --unrestricted--.

Col. 4, line 51, "lilps" should read --lips--.

Col. 4, line 55, "beaing" should read --bearing--.

UNITED STATES PATENT AND TRADEMARK OFFICE
CERTIFICATE OF CORRECTION

PATENT NO. : 4,753,767

DATED : June 28, 1988

INVENTOR(S) : Carl B. Havens

It is certified that error appears in the above-identified patent and that said Letters Patent is hereby corrected as shown below:

Col. 5, line 6, following the word "embodiment" insert therefore --,--.

Col. 5, line 19, "disadvantage" should read --advantage--.

Col. 5, line 23, "expandaded" should read --expanded--.

Col. 5, line 38, delete the word "the".

Col. 5, line 41, "embodiment" should read --embodiments--.

Signed and Sealed this

Thirty-first Day of January, 1989

*Attest:*

DONALD J. QUIGG

*Attesting Officer*　　*Commissioner of Patents and Trademarks*